US008915278B2

(12) United States Patent
Sinko

(10) Patent No.: US 8,915,278 B2
(45) Date of Patent: Dec. 23, 2014

(54) PRESS APPARATUS FOR WOOD PRODUCTS

(75) Inventor: Hannu Sinko, Villahde (FI)

(73) Assignee: Raute Oyj, Nastola (FI)

( * ) Notice: Subject to any disclaimer, the term of this patent is extended or adjusted under 35 U.S.C. 154(b) by 190 days.

(21) Appl. No.: 13/444,882

(22) Filed: Apr. 12, 2012

(65) Prior Publication Data

US 2012/0279666 A1 Nov. 8, 2012

(30) Foreign Application Priority Data

May 4, 2011 (FI) ...................................... 20115421

(51) Int. Cl.

*B32B 37/00* (2006.01)
*B27D 3/00* (2006.01)
*B27D 1/00* (2006.01)
*B27D 1/08* (2006.01)
*B27D 3/02* (2006.01)
*B27M 3/00* (2006.01)
*B30B 15/04* (2006.01)
*B30B 15/34* (2006.01)

(52) U.S. Cl.

CPC .. *B27D 3/00* (2013.01); *B27D 1/00* (2013.01); *B27D 1/08* (2013.01); *B27D 3/02* (2013.01); *B27M 3/0033* (2013.01); *B30B 15/04* (2013.01); *B30B 15/34* (2013.01)
USPC ........ 156/358; 156/359; 156/366; 156/380.6; 156/583.1

(58) Field of Classification Search

USPC ........... 156/358, 359, 379.6, 380.6, 580, 581, 156/583.1, 366; 100/207
See application file for complete search history.

(56) References Cited

U.S. PATENT DOCUMENTS

| | | | | |
|---|---|---|---|---|
| 3,814,787 | A | 6/1974 | Carlsson | |
| 4,543,147 | A * | 9/1985 | Noto et al. | 156/288 |
| 4,822,447 | A * | 4/1989 | Obermeier | 156/538 |
| 5,470,428 | A * | 11/1995 | Sanko | 156/498 |
| 5,472,556 | A * | 12/1995 | Sanko | 156/498 |
| 7,882,879 | B2 * | 2/2011 | Patterson et al. | 156/358 |
| 2008/0264274 | A1 * | 10/2008 | Haller et al. | 100/207 |

FOREIGN PATENT DOCUMENTS

| | | |
|---|---|---|
| CN | 101954665 | 1/2011 |
| EP | 867272 | 9/1998 |

OTHER PUBLICATIONS

Finnish Search Report dated Feb. 7, 2012, corresponding to Foreign Priority Application No. 20115421.

* cited by examiner

*Primary Examiner* — James Sells
(74) *Attorney, Agent, or Firm* — Young & Thompson

(57) ABSTRACT

A press apparatus for curing adhesive on inner adhesion surfaces of substantially continuous wood products (1) under synchronous compression heating. The apparatus includes at least two presses (2) having a mutual distance from each other fulfilling the precondition: L/(n−1), where L is the working length of each press and n is the number of presses in series.

15 Claims, 1 Drawing Sheet

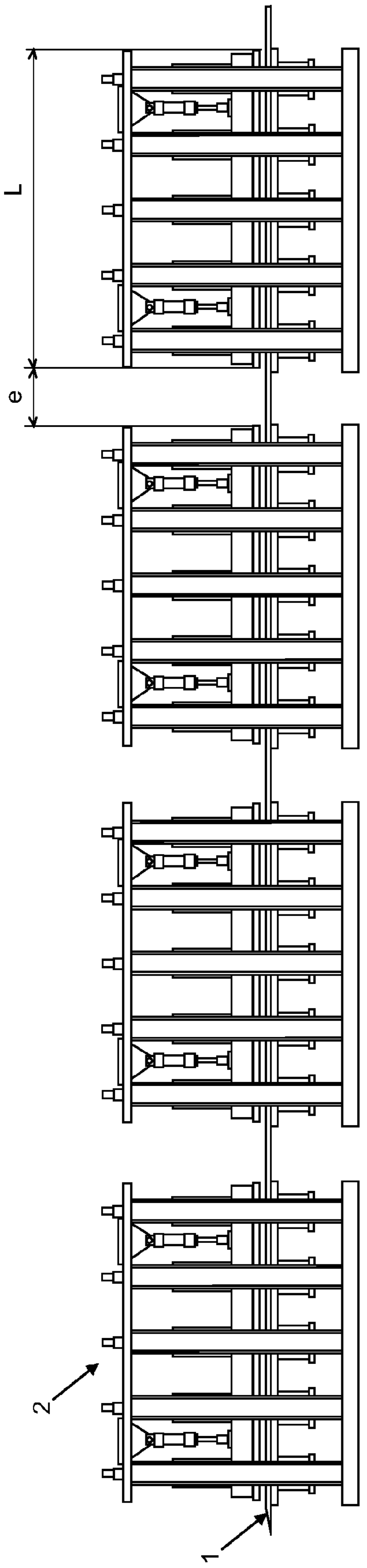
L
e
2
1

PRESS APPARATUS FOR WOOD PRODUCTS

FIELD OF THE INVENTION

The present invention relates to a press apparatus for wood products, in which the inner adhesion surfaces' adhesive of wood products produced substantially continuously can be cured under heating and compression. These kinds of wood products are, for example, the LVL-beam (Laminated Veneer Lumber) and different wooden boards produced in a similar way. The billets of these products are produced as continuous stacks by layering veneer sheets between which adhesive has been applied. The billets are then led to a compression treatment, where in at least some point the billet is heated for curing the adhesive. Continuous presses, in which the product to be compressed is between two rotating endless belts, have conventionally been used in production lines for these products. Heating devices operating according to different principles have been placed along the compression range for conducting heat to the product under compression.

BACKGROUND OF THE INVENTION

The heating may be implemented by using the convection principle in which the heat is conducted to the press belts, and from them onwards to the product. High-frequency heating (RF, HF) is also commonly used, where the wave-energy created by the heating device is led directly to the product for achieving a dielectric heating effect.

A continuous press is structurally expensive and demanding in terms of directing the heating.

A synchronous press providing a reasonable production capacity must be long, which is structurally demanding. Furthermore, it requires a stacking device having a length of at least one compression length of the product to be pressed.

Different operational problems have also been associated with the available equipments. Heat transfer from the surface to the interior is slow with devices operating according to the convection principle. Increasing the transfer rate of the temperature gradient by raising the surface temperature includes its own problems such as a sudden evaporation of water in wood material and the adhesive. On the other hand, in high-frequency heating the product is heated substantially uniformly in the depth direction, but problems due to sudden local evaporation of water have occurred also in this heating method. Primarily it is specifically the adhesion point that might snap open when releasing compression too early.

For each operation cycle the leading end of the product has to wait for rather a long period in a stacking device preceding a synchronous press having a long construction, at which time the behavior of the adhesive may cause problems, such as absorption, pre-mature curing etc.

SUMMARY OF THE INVENTION

A substantial improvement for these problems has been achieved with a press apparatus according to the invention, which is intended for the production of a substantially continuous wood product. The apparatus is based on a so-called synchronous press in which the product is led to an opening between press plates acting against each other, and the product in place between the plates is compressed by forcing the press plates towards each other. During compression, heat is conducted to the product by using some of the aforementioned methods. At least two presses are located in series at a predetermined distance from each other, so that when conveying a continuous product forward a working measure, each section of the product will spend a same amount of time in each press and a same amount of time between each press. That is, each product section will undergo an uniform treatment if the operating parameters of each press are held constant during operation. The precondition for this operation is: the distance between presses=L/(n−1), where L=working length of a press, n=number of presses.

BRIEF DESCRIPTION OF THE DRAWINGS

FIG. 1 illustrates a schematic example of the implementation of the present invention with four synchronous presses located in series for compression heating a substantially continuously fed LVL-product.

DETAILED DESCRIPTION OF THE INVENTION

For each press operating in series uniform operation parameters can be determined, that is compression pressure and heat input. Operation schemes where the operation parameters of presses operating in series differ from each other give, however, different degrees of freedom for the operation, where an advantageous product specific operation pattern can be determined for each product. Especially the amount of heat input at different stages is a useful operating variable. Also, an individual compression time can be regulated if necessary, although presumably the presses operate synchronously.

The "resting periods" between the presses are also advantageous for the operation. During a resting period the internal temperature differences of the product are able to equalize to some extent, and especially the elevated vapor pressure of local moist areas is able to equalize.

The apparatus sections between the presses can be in free contact with the environment, or alternatively be surrounded with an appropriate insulation. When using high-frequency heating, the insulation can be a radiation insulation. Heat insulation may also come in question, especially if convection heating is utilized in the presses.

The accompanying drawing illustrates a schematic example of the implementation of the present invention with four synchronous presses 2 located in series for compression heating a substantially continuously fed LVL-product 1. In the accompanying drawing, L is the working length of each press and e is the distance between each press.

The invention claimed is:

1. A press apparatus for curing adhesive on inner adhesion surfaces of substantially continuous wood products (1) under synchronous compression heating, comprising:

at least three presses (2) located in series, each said press including a pair of press plates that act against each other and provide a product opening between the pair of press plates, the press plates configured to compress a substantially continuous wood product located in the product opening, each press having a working length, through which series of presses the substantially continuous wood product passes, wherein the at least three presses (2) have a mutual distance from each other of L/(n−1), where n is the number of presses in series and L is the working length of each press, and a controller configured to control each of the presses in the series such that, with operating parameters of each press being held constant during operation, when conveying the substantially continuous product forward a working measure from i) a first press to a next, second press in the series, and ii) from the second press to a next, third press in series, each section of the product will spend a same first total amount of time in the presses and a same second total amount of time between the presses.

2. The press apparatus according to claim 1, characterized in that the presses are equipped with high-frequency heaters.

3. The press apparatus according to claim 1, characterized in that at least one press is regulated to an operating temperature differing from that of the other presses.

4. The press apparatus according to claim 1, characterized in that at least one press is regulated to a compression pressure differing from that of the other presses.

5. The press apparatus according to claim 1, characterized in that between the presses there is an insulation chamber through which the product passes.

6. The press apparatus according to claim 5, characterized in that the insulation chamber is radiation insulated.

7. The press apparatus according to claim 5, characterized in that the insulation chamber is heat insulated.

8. The press apparatus according to claim 2, characterized in that at least one press is regulated to heat input differing from that of the other presses.

9. The press apparatus according to claim 2, characterized in that at least one press is regulated to a compression pressure differing from that of the other presses.

10. The press apparatus according to claim 2, characterized in that between the presses there is an insulation chamber through which the product passes.

11. The press apparatus according to claim 3, characterized in that at least one press is regulated to a compression pressure differing from that of the other presses.

12. The press apparatus according to claim 3, characterized in that between the presses there is an insulation chamber through which the product passes.

13. The press apparatus according to claim 1, wherein, there are four presses (2) located in the series, the presses (2) have a mutual distance from each other of L/(3), where L is the working length of each press, and the controller is configured such that, when conveying the substantially continuous product forward the working measure, each section of the product will spend the same first total amount of time in the four presses and the same second total amount of time between the four presses.

14. The press apparatus according to claim 1, wherein, each of the at least three presses (2) are synchronous presses and when conveying the substantially continuous product forward from the first press to the second press in the series, the controller is configured such that the product concurrently spends time in each of the first and second presses.

15. The press apparatus according to claim 13, wherein, each of the four presses (2) are synchronous presses and when conveying the substantially continuous product forward the working measure, the controller is configured such that the product concurrently spends time in each of the four presses.

* * * * *